Dec. 17, 1940.  W. M. DILLON  2,225,210
TEMPERING VALVE
Filed July 5, 1938
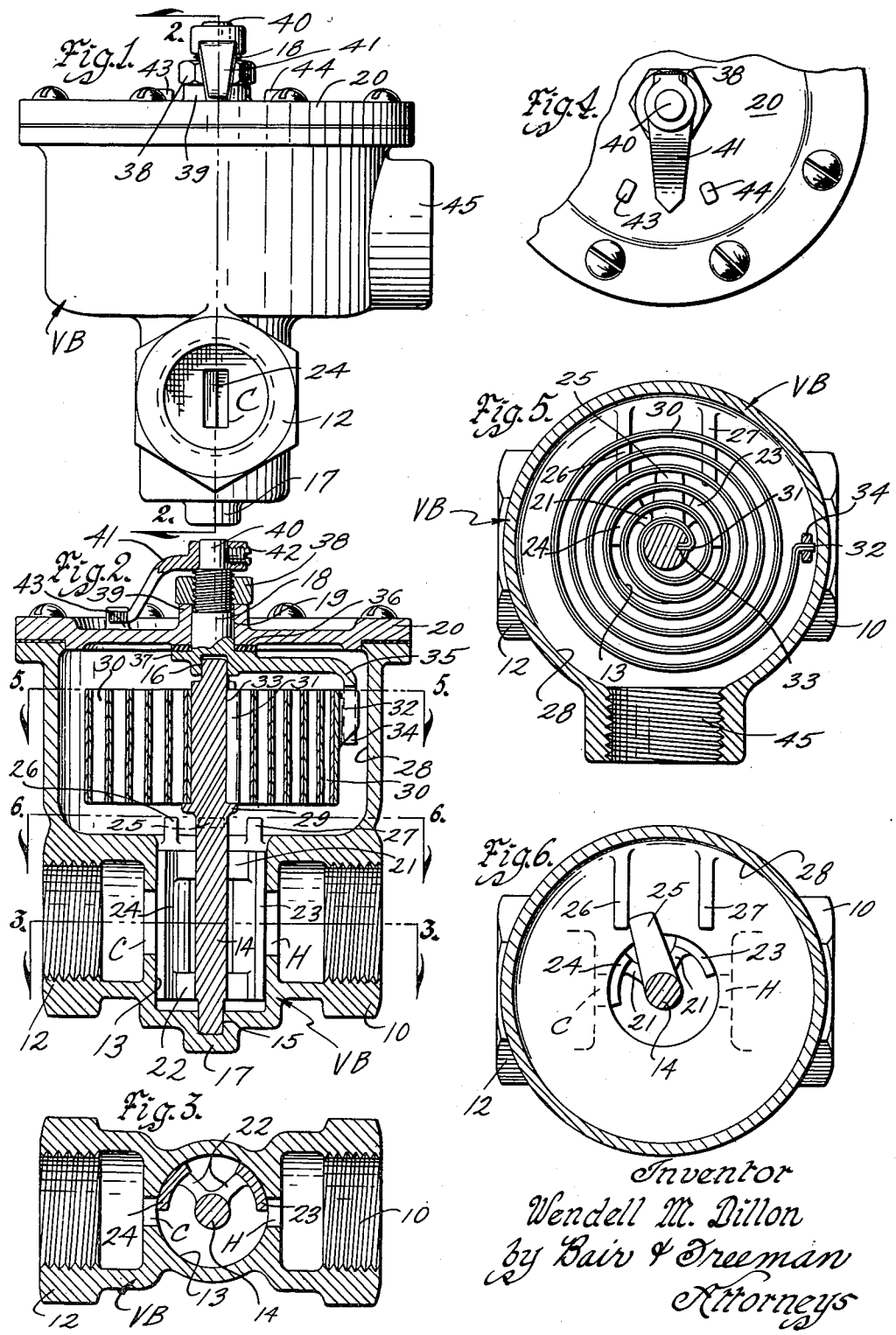
Inventor
Wendell M. Dillon
by Bair & Freeman
Attorneys Patented Dec. 17, 1940

2,225,210

UNITED STATES PATENT OFFICE 2,225,210

TEMPERING VALVE

Wendell M. Dillon, North Andover, Mass., assignor to Watts Regulator Company, Lawrence, Mass., a corporation of Massachusetts Application July 5, 1938, Serial No. 217,472

2 Claims. (Cl. 236—12)

An object of my invention is to provide a valve for tempering water or other liquids so that from the outlet of the valve liquid of the desired temperature can be obtained automatically, the mechanism of the valve being comparatively simple and inexpensive to manufacture and assemble.

A further object is to provide a valve body with hot and cold water inlet ports and to provide between the ports a cylindrical chamber in which is mounted a stem for rotation on the axis of the cylinder and which carries a pair of dampers or vanes for coacting with the hot and cold water inlet ports so as to proportion the inflowing water, the damper or vane elements being thermostatically controlled as to position.

Another object is to provide the cylinder chamber as an initial mixing chamber for the hot and cold water and to provide a secondary mixing chamber in which temperature responsive means such as a coiled bi-metallic element is mounted, the secondary chamber being of substantially greater volume than the initial mixing chamber so as to permit flow of the mixed water down the passage and give the water a better chance to effect change in the position of the temperature responsive element thereby minimizing the chance of overcontrol and hunting operation of the valve which, of course, is undesirable.

Still another object is to provide a simple arrangement for changing the range of the valve which is readily adjustable from the outside of the valve body yet which is so constructed that the necessity of a packing gland is entirely eliminated.

Further objects are to provide a novel type of friction free balanced valve whereby the valve is readily operated from the small amount of power generated in a bi-metal element as it responds to different temperatures; provide an inexpensive valve member which can be cast all in one piece and readily machined; provide a readily formed coiled bi-metallic element with means for easily and quickly attaching it to the valve member and to an adjusting member therefor and to provide an adjusting member of very simple construction capable of performing its intended function and capable of ready assembly relative to the coiled bi-metallic element.

With these and other objects in view my invention consists in the construction, arrangement and combination of the various parts of my device, whereby the objects contemplated are attained, as hereinafter more fully set forth, pointed out in my claims and illustrated in the accompanying drawing. Although the invention is susceptible of a variety of embodiments, it is unnecessary to fully describe and illustrate more than one in order to give a full understanding of the invention both from its structural and functional standpoints. Accordingly, I have illustrated a preferred and desirable embodiment of the invention in the accompanying drawing, in which:

Figure 1 is a side elevation of a tempering valve embodying my invention.

Figure 2 is a vertical sectional view thereof on the line 2—2 of Figure 1.

Figure 3 is a horizontal sectional view on the line 3—3 of Figure 2 showing the hot and cold water inlet ports and the coaction of the damper elements therewith.

Figure 4 is a partial plan view of the valve structure.

Figure 5 is a horizontal sectional view on the line 5—5 of Figure 2 showing the coiled bi-metallic element in the secondary mixing chamber of my valve and its coaction with the stem and adjusting means of the valve; and Figure 6 is a horizontal sectional view on the line 6—6 of Figure 2 showing a stop means for limiting the movement of the valve during operation.

On the accompanying drawing I have used the reference character VB to indicate generally a valve body. The valve VB admits hot and cold water through the ports H and C respectively. These communicate with threaded bosses 10 and 12 adapted to be appropriately connected with hot and cold water pipes (not shown) in the usual manner.

The valve body VB has therein a cylindrical bore 13 constituting an initial mixing chamber. A valve stem 14 is rotatably mounted on the axis of the cylinder 13, the lower end thereof being journaled in a socket 15 and the upper end thereof in a socket 16. The socket 15 is formed in a boss 17 on the lower end of the valve body VB while the socket 16 is formed centrally in a shank 18 which in turn is received in a bore 19 of a head plate 20 of the valve body. The head plate is mounted on the valve body so that the bore 19 is concentric with the bore 13 whereby the socket 16 being concentric with the shank 18 is likewise concentric with the cylinder 13.

The stem 14 has a pair of upper arms 21 and a pair of lower arms 22 extending therefrom as shown in Figures 6 and 3 respectively. Supported on the free ends of the arms 21 and 22 are valve dampers or vanes 23 and 24. The vane 23 is adapted to cooperate with the hot water port H to mask a part thereof and thereby reduce or increase the flow of water therethrough. The damper element 24 similarly cooperates with the cold water inlet port C. The damper elements are so mounted that when one of them reduces the flow of water through its cooperating port, the other in inverse relation increases the proportion of water flowing through its cooperating port.

The outer face of each damper element 23 and 24 is machined on a radius from the axis of the stem 14 and this radius is slightly smaller than the cylinder 13 providing a few thousandths clearance between the damper elements and the cylinder, shown by a heavy line in Figures 2 and 3 on the drawing. The lower and upper ends of the stem are a working fit in the sockets 15 and 16 as shown by a light line between these parts in Figure 2. Accordingly the damper elements are not restricted against free movement by frictional engagement by the cylinder 13 and there is ample chance for the water in the valve body to flow around the entire surface of each of the damper elements thereby so balancing the valve that its differential of operation is reduced to a minimum. The only friction to be encountered is that present in the sockets 15 and 16 which obviously is very little when these are made a free working fit and are lubricated by a film of water between them which is always present due to the valve body being constantly charged with water.

To avoid the possibility of the valve getting out of an operative position I provide limiting stop means consisting of an arm 25 formed on the stem 14 and stop lugs 26 and 27 formed in the valve body. These stop lugs are positioned in a cylinder portion 28 of the valve body VB which serves as a secondary mixing chamber and is of substantially greater volume than the initial mixing chamber in the cylinder 13 as is evident by comparison of their respective diameters in the drawing.

The stem 14 is provided with a shoulder or flange 29. Resting on this flange is a coiled bi-metallic element 30 having an inner hooked end 31 and an outer hooked end 32. The inner hooked end engages in a longitudinal slot 33 of the valve stem 14, the portion of the element 13 adjacent the hook element 31 being of a diameter which snugly fits the stem as shown in Figure 5 and thereby prevents any back lash or relative movement of the parts during operation of the valve structure. The hook end 32 is adapted to fit within a slot 34 formed in an arm 35 which extends laterally from the shank 18.

A gasket 36 interposed between a flange 37 of the shank 18 and the head plate 20 forms a seal at the top of the valve. Outside the valve body, a lock nut 38 is threaded on the shank 18 where it engages against a boss 39 of the head plate.

On the shank 18 is a reduced portion 40 on which is mounted a pointer 41, the function of which will be presently described. A set screw 42 for securing the pointer may be utilized to retain the pointer in any desirable position relative to the shank 18, such position being initially determined and set at the factor. The pointer 41 is limited in its movement between a pair of stops 43 and 44 formed on the head plate 20 of the valve.

Practical operation

In operation of my tempering valve, hot water enters the cylinder 13 through the hot water port H and cold water enters through the port C. The hot and cold water are mixed in the initial mixing chamber 13 and then flow on into the secondary mixing chamber 28. In the secondary mixing chamber, the temperature of the water affects the temperature responsive bi-metallic coil 30 before it flows outwardly from the valve body VB through an outlet boss 45. The location of the boss 45 may be at any desired side of the valve body VB depending upon the particular installation being made.

If the temperature of the mixed water in the secondary chamber 28 is proper as determined by the position of the pointer 41, the stem 14 remains stationary. If the temperature is higher than the predetermined setting, it causes the bi-metallic elements 30 to contract or wind up thereby turning the stem 14 of the dampers 23 and 24 clockwise to increase the flow of incoming cold water. Conversely if the temperature of the mixed water is lower than that for which the valve is set, the damper elements will be rotated counter-clockwise for decreasing the inflow of cold water and increasing the inflow of hot water. The maximum control position, is illustrated in Figure 6 wherein the cold water has been entirely shut off and only hot water is entering, but this hot water will necessarily not be at a temperature higher than that for which the valve is set. In this position the stop arm 25 will be at rest against the stop lug 26.

When it is desirable to change the setting of the valve, the lock nut 38 can be slightly loosened whereupon the pointer 41 can be swung toward either of the stops 43 or 44 as far as required for the setting desired. The nut 38 is then retightened so as to compress the gasket 36 and thus prevent any subsequent leakage of the water from the valve around the shank 18.

My valve structure, it will be noted, involves the use of minimum number of parts to accomplish the results desired. The valve stem and the valve dampers are all cast in one piece and the surfaces thereof requiring machining are all readily machined on a lathe at one setting with the exception of the slot 33 which can be milled or shaped into the valve stem. The stem is rotatably mounted accurately on the center of the cylinder 13 when the head plate 20 and the shank 18 are assembled relative to the valve body.

The space in the cylinder 13 is quite open, being broken up only by the damper elements 23 and 24, the arms 21 and 22 and the stem 14. The cylinder is of relatively small diameter and this fact coupled with the open construction of the valve member in the cylinder tends to produce a thorough inner mixing of the hot and cold water as it enters the cylinder 13. In addition the mixing is made more thorough by an accelerated velocity of the water as it comes through the restricted ports H and C. There is as a result a pronounced tendency to diffuse the two separate currents of hot and cold water in the cylinder 13 before the water flows into the secondary mixing chamber 28. As the water enters the chamber 28, the velocity immediately drops appreciatively, thus allowing the mixed water to become stabilized as to temperature throughout and flow slowly over the bi-metal element 30 to thoroughly and uniformly heat or cool it depending upon the relative temperature of the water entering the chamber 28 and the water that has previously effected the position of the thermostat. Sufficient time must be given, of course, for the water to flow through the chamber 28 without over-controlling the valve which would cause a continual hunting action. By enlarging the chamber 28 to the relative size shown, I have found that the velocity of the water traveling through it is so slowed down that for all reasonable demands such hunting action is entirely eliminated.

The open skeleton-like construction of the valve member in the cylinder 13 tends to stabilize the action of the valve and the particular mounting of the valve member reduces friction to the least possible minimum. A freer acting valve and more uniform tempering action is thereby experienced.

The particular arrangement of the shank 18 supporting on its flange 37 the gasket 36 interposed between the flange and the head member 20 is meritorious in that the nut 38 mounted on the shank 18 operates in a manner to compress the gasket thus eliminating the necessity of using a packing gland in connection with the adjusting mechanism for the valve. This feature and the others as above pointed out combine to make a valve structure which is inexpensive to manufacture yet entirely satisfactory and reliable in operation.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. An all-automatic tempering valve device of the character disclosed comprising a valve body having a closed bottom, laterally directed inlets for hot and cold fluids adjacent the bottom, a vertical cylindrical well forming an initial mixing chamber having a cross sectional area more than double the cross sectional area of the inlets positioned between said inlets and a second vertical cylindrical chamber having a diameter in excess of twice the diameter of the first chamber positioned axially above and adjoining said first chamber having a constantly open passage connecting with the first chamber, said passage having a cross section substantially equal in area to a cross section of the first chamber, said passage and chambers providing thereby a path for fluid of progressively increasing cross-sectional area, said second chamber having an outlet at the side and a head plate closing a remaining open side of said second chamber, said valve device having moving parts comprising a valve stem adapted to be journalled at the lower end in the bottom of said first chamber, a shank rotatably mounted in the head plate in axial alignment with the stem having a flange beneath the plate, a threaded extension above said plate and a relatively deep axial socket in the shank forming a journal for the other end of said stem, arcuate valve dampers on the stem positioned in the first chamber and having sliding circumferential contact with the wall thereof for opening and closing said inlets in inverse proportion, an arm on said stem and cooperating lugs on the body at the upper end of said lower chamber for providing a fixed limit of rotation for said dampers, a spiral coil of bimetal ribbon substantially filling said upper chamber with a series of separated convolutions having the inner end thereof anchored upon the stem, a laterally extending hooked arm on said shank anchored to the outer end of the coil, an internal packing between the shank flange and the plate, a nut on the threaded outer end for drawing up said flange and packing independently of the stem, and a pointer fastened to the shank to show the relative setting of the valve, all of said moving parts being adapted for insertion into the valve body from one side only thereof and secured therein by said plate.

2. An all-automatic tempering valve device of the character disclosed comprising a valve body having a closed bottom, laterally directed inlets adjacent the bottom for fluids of different physical status, a vertical cylindrical well forming an initial mixing chamber having a greater cross sectional area than the inlets and positioned adjacent said inlets, a second vertical cylindrical chamber substantially greater in cross sectional area than the first chamber positioned immediately above and adjoining said first chamber having a constantly open passage connecting with the first chamber coincident with the open end of the first chamber, an outlet at the side of said second chamber and a head plate for closing said second chamber, moving parts for said valve device comprising combined arcuate damper elements and a valve stem having a pair of journalled mountings one at each side of the valve body, a shank in the head plate in axial alignment with the stem axially adjustable and having a socket therein having the bottom thereof positioned in spaced relation to the end of said stem forming one of said journalled mountings, said arcuate valve dampers being rotatable in opening and closing relation to said inlets, a spiral coil of bimetal substantially filling said upper chamber having one end anchored directly to the combined stem and valve, a laterally extending member on said shank anchored to the other end of the coil, said shank having a single packing gland subjected to endwise compression by axial adjustment of the shank interiorly positioned relative to said head plate and means for producing said axial adjustment independently of the stem for tightening said packing, and a pointer fastened to the shank to indicate the relative setting of the valve.

WENDELL M. DILLON.